United States Patent [19]

Sparks

[11] 3,741,477

[45] June 26, 1973

[54] TEMPERATURE SENSITIVE FLOW-DIVIDING VALVE

[75] Inventor: Brian Edmund Sparks, Warwick, England

[73] Assignee: Joseph Lucas (Industries) Limited, Birmingham, England

[22] Filed: June 16, 1971

[21] Appl. No.: 153,646

[30] Foreign Application Priority Data
June 16, 1970   Great Britain.................... 29,107/70

[52] U.S. Cl...................... 236/93, 236/34.5, 236/99
[51] Int. Cl. .......................................... G05d 23/12
[58] Field of Search....................... 236/34, 34.5, 92, 236/99, 93; 165/40, 35

[56] References Cited
UNITED STATES PATENTS
1,920,505  8/1933   Henney et al..................... 236/92 B
2,601,777  7/1952   Woodward..................... 236/92 R X
2,917,067  12/1959  Pearl............................. 236/92 R X
3,119,559  1/1964   Heidorn........................... 236/92 R Primary Examiner—William E. Wayner
Attorney—Holman & Stern

[57] ABSTRACT

A temperature sensitive flow-dividing valve has an inlet and first and second outlet. A closure member between the inlet and the second outlet is movable by a bellows within which is a temperature-sensitive fluid. This bellows is also responsive to a rise in pressure at the inlet to close the valve. A further bellows is responsive to a rise in pressure at the second outlet to move the closure member to open the valve.

9 Claims, 1 Drawing Figure

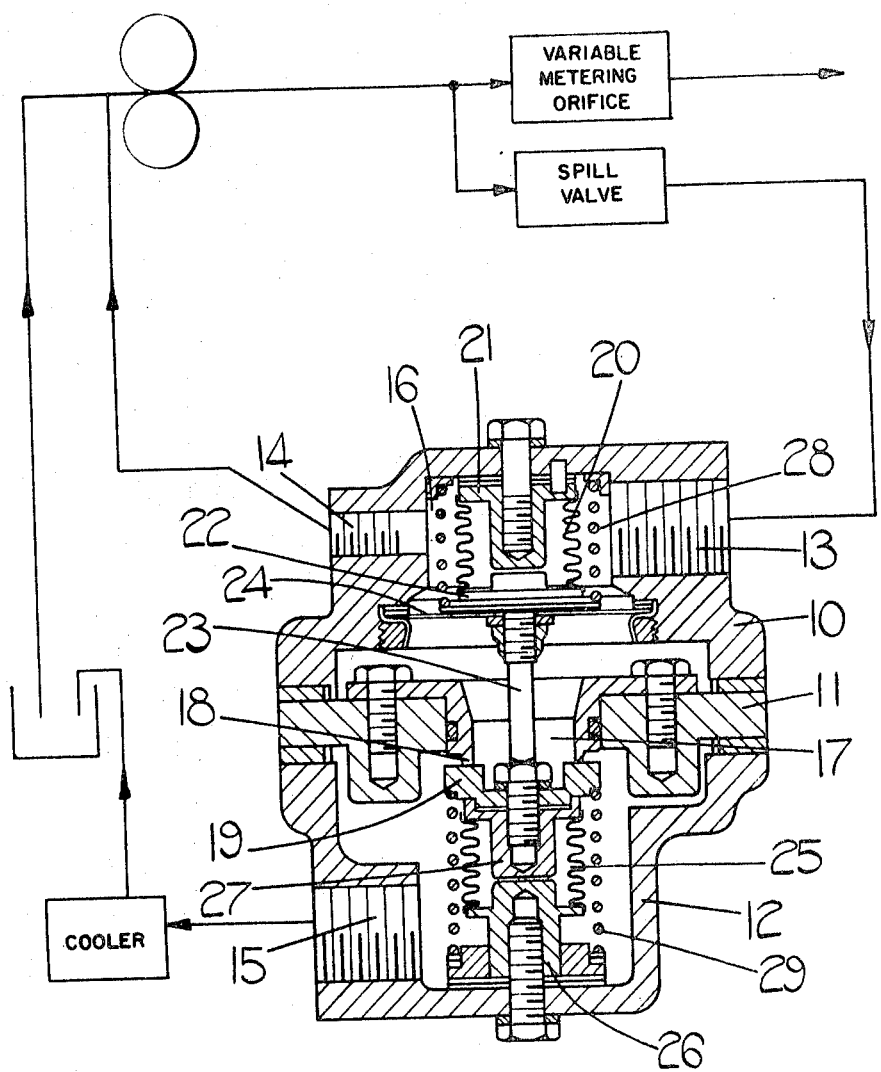

TEMPERATURE SENSITIVE FLOW-DIVIDING VALVE

This invention relates to a temperature-sensitive flow-dividing valve, and has as an object to provide such a valve in a convenient form.

According to the invention a temperature-sensitive flow-dividing valve comprises a body having an inlet and first and second outlets, a chamber connecting the inlet and first outlet, a valve seat between the inlet and second outlet, a closure member engageable with the seat to shut the valve, a sealed bellows unit containing a fluid and situated in the said chamber, the said bellows unit having one end member secured to the body and another end member engageable with the closure member and movable in response to an increase in the pressure at the inlet and in the pressure of the said fluid respectively to urge the closure member in first and second directions relative to the seat, and an evacuated bellows unit within the body downstream of the seat, the said evacuated bellows unit having one end member secured to the body and another end member movable in response to an increase of pressure at the second outlet to urge the closure member in the second direction, the effective areas of the bellows units and the closure member being substantially identical, whereby pressures within the inlet and second outlet acting on the closure member to urge the latter in the first and second directions respectively are opposed by the effects of the said pressures on the sealed and evacuated bellows units respectively.

A flow-dividing valve according to the invention will now be described by way of example and with reference to the accompanying drawing.

The valve shown has a body formed in three parts 10, 11, 12 and having an inlet 13 and a pair of outlets 14, 15. Inlet 13 communicates with outlet 14 via a chamber 16. Inlet 13 communicates with outlet 15 via a passage 17 defining a seat 18 for a closure member 19. A sealed bellows unit 20 has an end member 21 by means of which the unit 20 is secured to the body part 10 within the chamber 16. The unit 20 has a further end member 22, remote from the member 21. A stem 23 extends axially from the member 22 and engages the closure member 19. End member 22 also carries a spider 24 which is secured to the body part 10 and by means of which the stem 23 is maintained centrally within the passage 17. Member 21 has a boss which extends axially within the unit 20 and which is engageable with the end member 22 to limit compression of the bellows unit 20. Bellows unit 20 is partly filled with a liquid, the remainder of the unit 20 being occupied by vapor from the liquid, no air being present. Liquids which have been found to be suitable for this application are Heptane and the flourinated compound FC75. Both of these compounds undergo a considerable change in vapor pressure over the temperature range at which the valve operates. and An evacuated bellows unit 25 has an end member 26 secured to the body part 12 and a further end member 27 upon which the closure member 19 is carried. Members 26, 27 have inwardly extending axial bosses which co-operate to limit compression of the bellows unit 25. The effective cross-sectional areas of the bellows units 20, 25 and the passage 17 are identical. A spring 28 engages the end member 22 so as to bias the latter in a direction to cause stem 23 to urge the closure member 19 to an open position. A spring 29 biases the closure member 19 to a closed position.

In use, fluid flows from the inlet 13 via the chamber 16 to the outlet 14. The pressure of the fluid in chamber 16 acts upon the closure member 19 within the cross-sectional area of the passage 17 in a direction tending to open the valve. Fluid pressure in chamber 16 also acts to compress the bellows unit 20 against the spring 28. The force tending to open the valve thus remains, constant for all pressures within chamber 16.

A rise in the temperature of the fluid in chamber 16 causes an increase in the vapor pressure within the bellows unit 20. When this pressure is sufficiently high to overcome the bias applied by spring 29, the valve opens and fluid flows from inlet 13 to outlet 15.

The pressure at outlet 15 tends to urge the closure member 19 to a closed position. The pressure at outlet 15 also acts upon bellows unit 25 to offset the bias applied by spring 29. The nett force tending to close the valve thus remains constant, irrespective of the pressures at the outlet 15.

A valve of the type described is particularly applicable to return to the upstream side of a pump, via a cooler, a proportion of a fuel passing through a spill valve, the amound of fuel returning via the cooler being dependent on the temperature of the fuel delivered by the pump.

I claim:

1. A temperature-sensitive flow-dividing valve comprising a body, having an inlet and first and second outlets, a chamber connecting the inlet and first outlet, a valve seat between the inlet and second outlet, a closure member engageable with the seat to shut the valve, a sealed bellows unit containing a fluid and situated in the said chamber, the said bellows unit having one end member secured to the body and another end member engageable with the closure member and movable in response to an increase in the pressure at the inlet and in the pressure of the said fluid respectively to urge the closure member in first and second directions relative to the seat, and an evacuated bellows unit within the body downstream of the seat, the said evacuated bellows unit having one end member secured to the body and another end member movable in response to an increase of pressure at the second outlet to urge the closure member in the second direction, the effective areas of the bellows units and the closure member being substantially identical whereby pressures within the inlet and second outlet acting on the closure member to urge the latter in the first and second directions respectively are opposed by the effects of the said pressures on the sealed and evacuated bellows units respectively.

2. A valve is claimed in claim 1 in which the first-mentioned bellows unit is partly filled with a liquid which has a considerable change in vapor pressure over the temperature range at which the valve, in use, operates.

3. A valve as claimed in claim 2 in which the part of the first mentioned bellows not occupied by the liquid is filled with vapor from the liquid.

4. A valve as claimed in claim 2 in which the said liquid is heptane.

5. A valve as claimed in claim 2 in which the liquid is a flourinated compound.

6. A valve as claimed in claim 1 in which the end members of the first mentioned bellows unit have respective inwardly extending bosses which are interengageable to limit compression of the associated bellows unit.

7. A valve as claimed in claim 1 in which the end members of the evacuated bellows unit have respective inwardly extending bosses which are interengageable to limit compression of the evacuated bellows unit.

8. A valve as claimed in claim 1 which includes a biasing means urging the closure member in the first direction.

9. A valve as claimed in claim 1 which includes biasing means urging the closure member in the second direction.

\* \* \* \* \*